United States Patent
Betman et al.

[11] Patent Number: 6,074,137
[45] Date of Patent: Jun. 13, 2000

[54] CUTTING TOOL ASSEMBLY

[75] Inventors: Benjamin Betman, Kiryat Chaim; Gideon Boianjiu, Kfar Vradim, both of Israel

[73] Assignee: Iscar Ltd., Israel

[21] Appl. No.: 08/987,164

[22] Filed: Dec. 8, 1997

[30] Foreign Application Priority Data

Dec. 6, 1996 [IL] Israel ........................................ 119776

[51] Int. Cl.[7] .................................................. B23B 27/16
[52] U.S. Cl. ........................ 407/103; 407/113; 407/114; 407/120
[58] Field of Search ............................... 407/66, 77, 102, 407/103, 113, 114, 120, 73, 88

[56] References Cited

U.S. PATENT DOCUMENTS

| | | | |
|---|---|---|---|
| Re. 26,168 | 3/1967 | Lundgren | 407/77 X |
| 3,160,945 | 12/1964 | Johnson | 407/103 |
| 3,399,442 | 9/1968 | Jones et al. | . |
| 4,084,917 | 4/1978 | Stumpp | 407/114 |
| 4,294,566 | 10/1981 | Boone | 407/114 |
| 4,539,875 | 9/1985 | Lee et al. | 407/113 X |
| 4,681,488 | 7/1987 | Markusson | 407/113 |
| 4,682,916 | 7/1987 | Briese | 407/113 |
| 5,503,509 | 4/1996 | von Haas et al. | . |
| 5,597,271 | 1/1997 | Men et al. | 407/113 |
| 5,709,509 | 1/1998 | Wegener et al. | 407/114 |

FOREIGN PATENT DOCUMENTS

| | | | |
|---|---|---|---|
| 0 162 029 | 11/1985 | European Pat. Off. | . |
| 362039106 | 2/1987 | Japan | 407/113 |
| 84201215 | 7/1995 | Taiwan | . |
| 2 081 142 | 2/1982 | United Kingdom | . |
| 093019879 A1 | 10/1993 | WIPO | 407/113 |
| WO 91/01839 | 2/1996 | WIPO | . |
| WO 96/08331 | 3/1996 | WIPO | . |

*Primary Examiner*—Henry W. H. Tsai
*Attorney, Agent, or Firm*—Pennie & Edmonds LLP

[57] ABSTRACT

A cutting tool assembly for turning a stepped square shoulder on a workpiece of a limited maximum depth of cut, the cutting tool assembly including a toolholder for replaceably receiving a substantially square cutting insert with concave side edges and acute insert cutting corners.

16 Claims, 5 Drawing Sheets

CUTTING TOOL ASSEMBLY

FIELD OF THE INVENTION

The invention is in the field of cutting tool assemblies for turning operations. In particular, the invention relates to cutting tool assemblies and cutting inserts therefor for turning stepped square shoulders.

BACKGROUND OF THE INVENTION

For turning a stepped square shoulder on a workpiece, a cutting tool assembly requires a cutting insert with an acute operative insert cutting corner, a tool back clearance angle $\kappa_n$ along its inoperative cutting edge and an obtuse entering angle $\kappa$ along its operative cutting edge. Such an entering angle enables an outwardly directed feed out movement to square out a shoulder, in particular, an outwardly directed radial feed out movement in the case of external longitudinal turning operations and an outwardly directed axial feed out movement in the case of external radial turning operations.

In view of these restrictions, cutting inserts for turning stepped square shoulders are either rhomboidal or triangular, thereby having respectively two or three indexable insert cutting corners when single-sided. Such cutting inserts are, for example, as illustrated and described in EP 0 162 029 A2, each insert cutting corner being formed as a protruding nose portion at the junction between centrally depressed insert sides. The cutting inserts are preferably double sided so as to be respectively formed with four or six indexable insert cutting corners.

SUMMARY OF THE INVENTION

It is an object of the present invention to provide a cutting tool assembly for turning stepped square shoulders, the cutting tool assembly being adapted for use with a cutting insert formed with more indexable insert cutting corners.

In accordance with a broad aspect of the present invention, there is provided a cutting tool assembly for turning a stepped square shoulder on a workpiece, the cutting tool assembly comprising a toolholder for replaceably receiving a cutting insert presenting an acute insert cutting corner at the juncture of substantially concave operative and inoperative cutting edges, characterized in that
said cutting insert is substantially square shaped and is so disposed in a top view of the cutting tool assembly that a clearance between said operative cutting edge and a first surface of the stepped square shoulder is less than a clearance between said inoperative cutting edge and a second surface of the stepped square shoulder at equal distances along said cutting edges whereby the location along the operative cutting edge whereat there is a minimal clearance from said first surface limits the maximal depth of cut of the cutting tool assembly to less than the length of the cutting insert's side.

The present invention is based on the realization that a fully indexable substantially square cutting insert with concave side edges can be employed for turning a stepped square shoulder on a workpiece in such cases where a maximum desired depth of cut in a direction substantially transverse to an initial feed direction of the cutting tool assembly is less than the length of the cutting insert's side.

In accordance with a further aspect of the present invention, there is provided a cutting insert comprising a substantially square upper surface, a lower surface and side surfaces intersecting with said upper surface at four substantially concave side edges each having a central portion between adjacent lateral portions, each pair of adjacent lateral portions meeting at an acute insert cutting corner, characterized in that each of said central portions, which are coextensive with a throughgoing bore formed in the insert is substantially straight and the angle of each of said acute insert cutting corners is in the range of about $83°\pm5°$.

A cutting insert according to the pre-characterizing portion of Claim 4 has been illustrated and described with reference to FIG. 3 of U.S. Pat. No. 5,503,509, however, for drilling applications which require that the entire length of a cutting edge be operative. As shown, the side edges of the cutting insert do not have substantially straight central portions and, moreover, the angle of each of its acute insert cutting corners denoted "c" is in the region of 70° since each side edge's partial cutting edge segments converge to form a vertex of the side edge.

The cutting insert of the present invention is characterized by virtue of each of its side edges having a substantially straight central portion and the angle of each of its acute insert cutting corners being in the region of $83°\pm5°$. This construction ensure that, on the one hand, the strength of the cutting insert is maximized both at its insert cutting corners and at its weakest portion where its cross section area is minimal, namely, at its throughgoing bore and, on the other hand, the angle of an operative insert cutting corner remains acute when the cutting insert is suitably mounted in a toolholder.

The cutting insert is preferably double sided, thereby being formed with a total of eight indexable insert cutting corners. The cutting insert can be of either a negative or a double positive relief flank geometry. Alternatively, the cutting insert can be single sided and of a positive relief flank geometry.

BRIEF DESCRIPTION OF THE DRAWINGS

For a better understanding of the present invention and to show how the same can be carried out in practice, reference will now be made to the accompanying drawings, in which.

DETAILED DESCRIPTION OF THE DRAWINGS

Turning now to FIGS. 1–4, a cutting tool assembly 1 is adapted for external longitudinal turning of a stepped square shoulder 5 on a workpiece W rotatable about an axis of rotation A up to a limited radial depth of cut as described hereinbelow.

Figure 1:
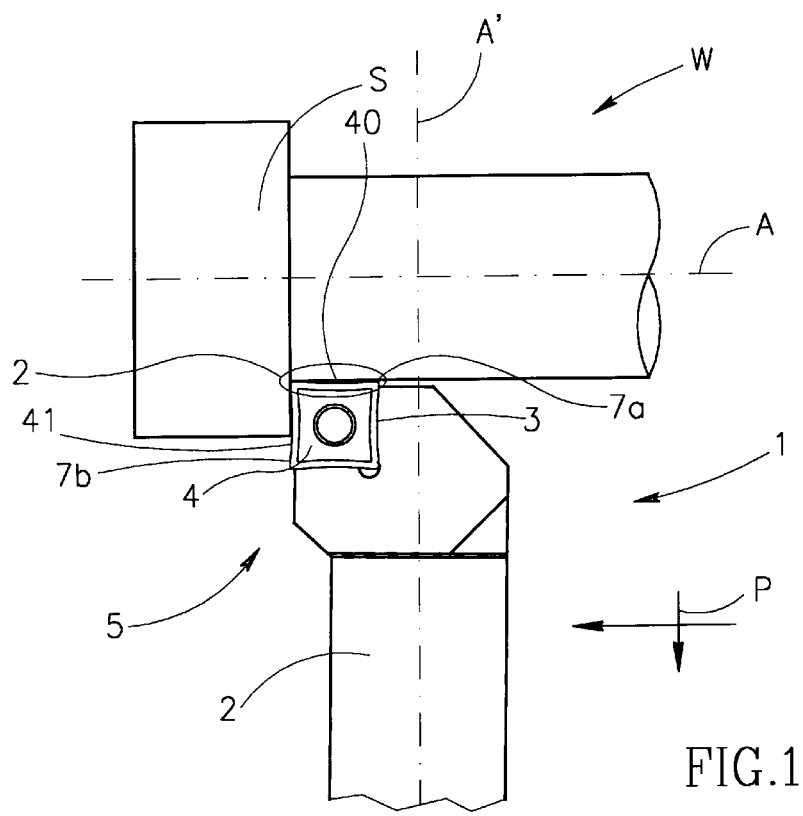
FIG. 1 is a plan view of a cutting tool assembly for external longitudinal turning of a stepped square shoulder on a workpiece in accordance with a first embodiment of the present invention.
Figure 7:
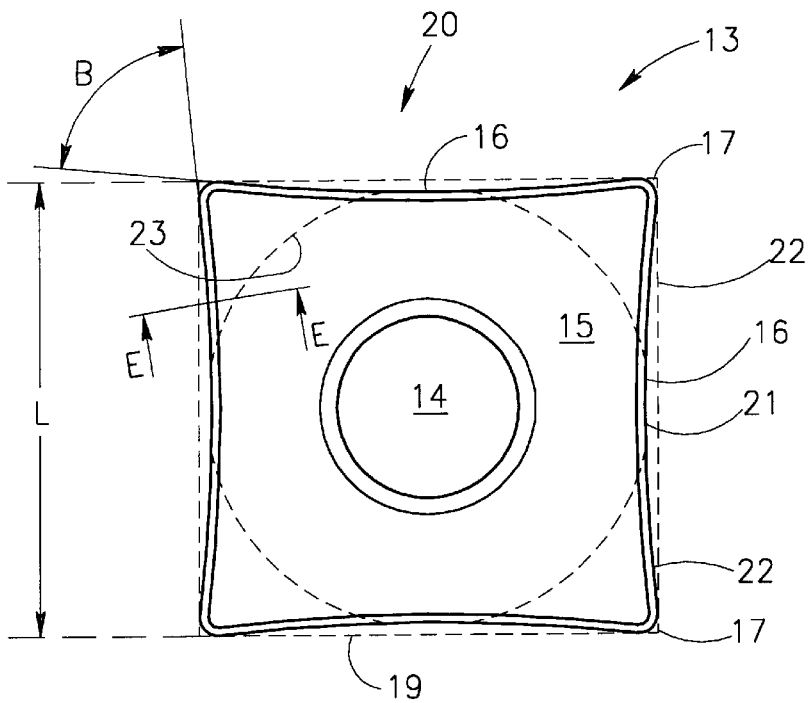
FIG. 7 is a plan view of a cutting insert for use in the cutting tool assemblies of FIGS. 1 and 5.
Figure 8:
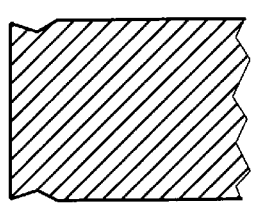
FIGS. 8–10 are various possible cross sections of the cutting insert of FIG. 7 along line E—E.
Figure 9:
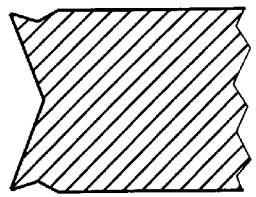

The cutting tool assembly 1 includes a double negative rake toolholder 2 having a longitudinal axis A' substantially perpendicular to the workpiece's axis of rotation A and an insert receiving pocket 3 at its leading end for replaceably receiving a double sided cutting insert 4 secured via a clamping device 5 (not shown), the cutting insert 4 being of the type shown in FIGS. 7–9. As seen in FIG. 1, assembly's front cutting edge 40 extends beyond the tool holder at said leading end along said longitudinal axis, while the assembly's side cutting edge 41 extends beyond the tool holder at said leading end in a lateral direction transverse to said longitudinal axis.

The cutting tool assembly 1 presents an acute operative insert cutting corner 7 to the workpiece W, the operative insert cutting corner 7 being at the juncture of an inoperative concave cutting edge 8 and an operative concave cutting edge 10, the cutting edge 10 having a lateral portion 10A adjacent the operative insert cutting corner 7. Here, the inoperative concave cutting edge 8, which is the assembly's front cutting edge, connects the operative insert cutting corner 7 to an inoperative leading insert cutting corner 7a, while the operative concave cutting edge 10, which is the assembly's side cutting edge, connects the operative insert cutting corner 7 to an inopertive trailing insert cutting corner 7b.

Figure 2:
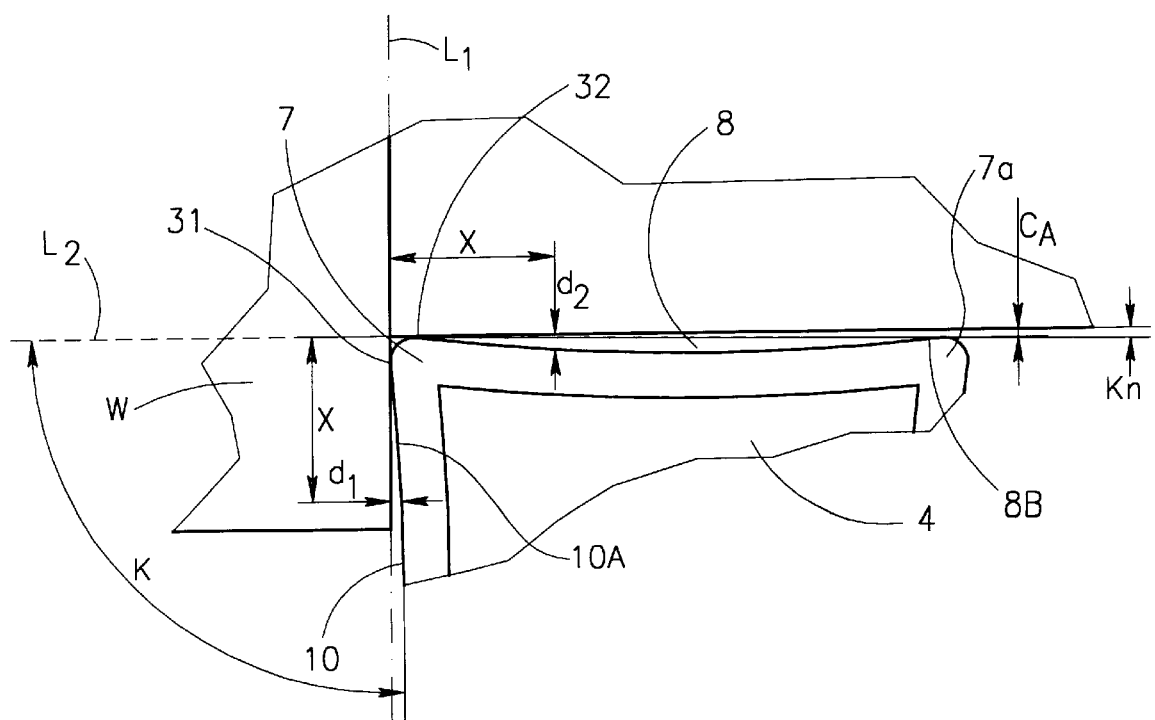
FIG. 2 is a close-up view of the operative insert cutting corner of the cutting tool assembly of FIG. 1.

As shown in FIG. 2, the cutting insert 4 is so disposed that a clearance $d_1$ between the cutting edge 10 and the shoulder's end face is less than a clearance $d_2$ between the cutting edge 8 and the shoulder's cylindrical face at equal distances X along the cutting edges 8 and 10, the square shoulder's end and cylindrical faces respectively constituting its first and second surfaces. Thus, in the plan view of the assembly and workpiece seen in FIG. 1 and the corresponding close-up of FIG. 2, the square shoulder's end face is collinear with an imaginary line L1 parallel to the tool holder's longitudinal axis A' and tangential to the outermost portion 31 of the insert's operative cutting corner 7, relative to the longitudinal axis A'. Similarly, in this same view, the square shoulder's cylindrical face is collinear with an imaginary line L2 perpendicular to the tool holder's longitudinal axis and tangential to an forwardmost portion 32 of the insert's operative cutting corner, in the direction of the tool holder's leading end. In FIGS. 1 and 2, clearance d1 is smaller than clearance d2, when the clearances are measured at a distance X from the intersection of L1 and L2 along the assembly side and assembly front cutting edges, respectively.

Thus, in this arrangement, the inoperative cutting edge's trailing end 8B has a back clearance C from the shoulder's cylindrical face whilst the operative cutting edge's lateral portion 10A delimits an obtuse entering angle κ which enables an outwardly directed radial feed out movement P.

As shown in FIGS. 1 and 2, due to the concavity of the operative cutting edge 10, there is a location therealong at which there is a minimal clearance from the shoulder's end face. This limits the maximal radial depth of cut of the cutting tool assembly 1 to less than the length of the cutting insert's side when squaring out a stepped shoulder in the direction P.

Figure 3:
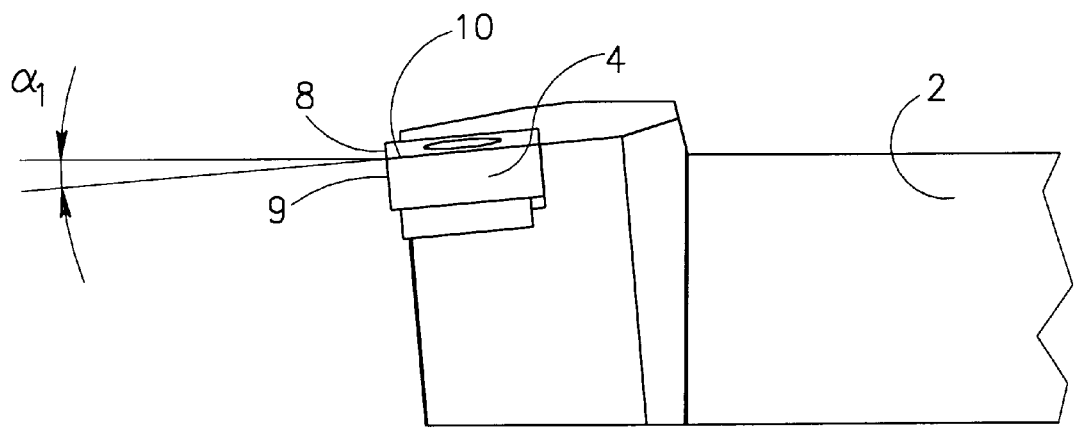
FIGS. 3 and 4 are respectively side and end views of the cutting tool assembly of FIG. 1.
Figure 4:
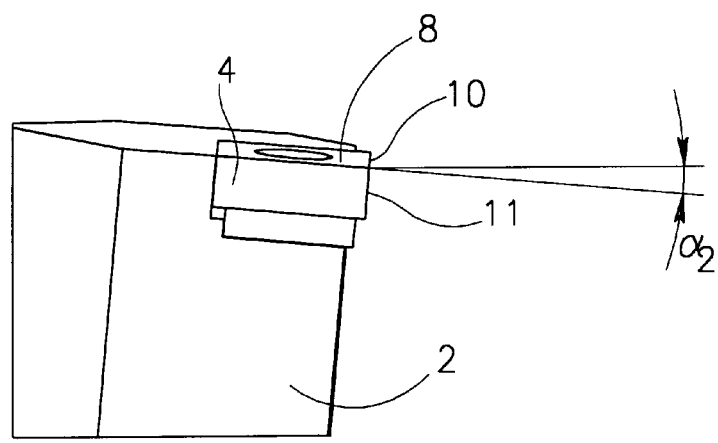

As shown in FIGS. 3 and 4 respectively, typical rake angles imparted by the toolholder 2 are a so-called "negative back rake angle" $\alpha_1$ to provide relief along an exposed side surface 9 of the cutting edge 8 and a so-called "negative side rake angle" $\alpha_2$ to provide relief along an exposed side surface 11 of the cutting edge 10 from the workpiece. Typical values of the rake angles are as follows: $\alpha_1 \approx \alpha_2 \approx 6°$.

Figure 5:
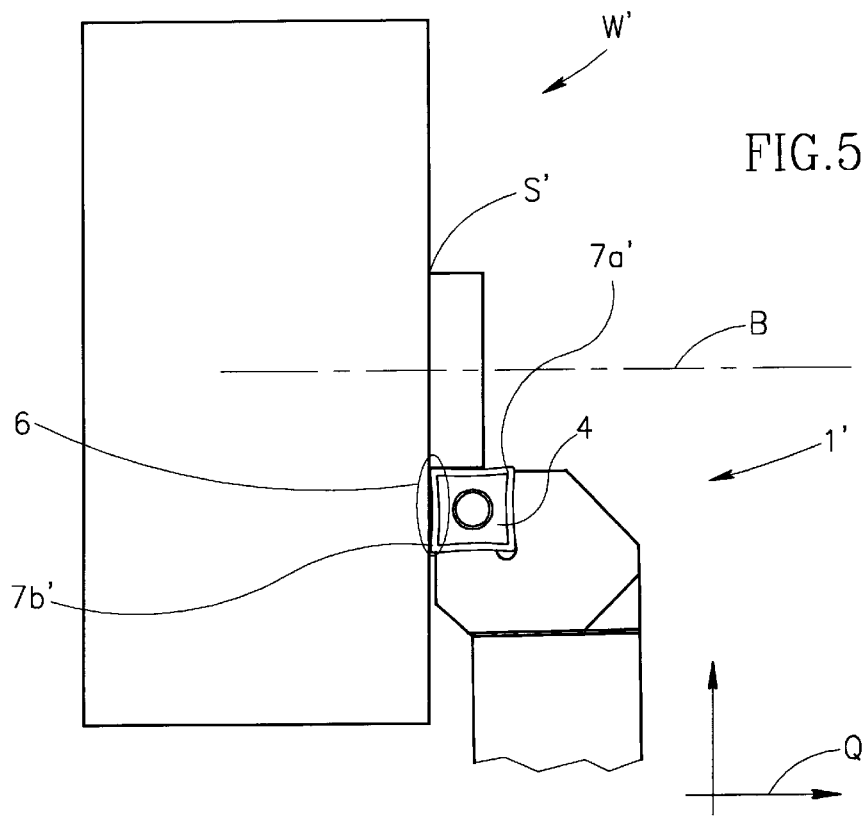
FIG. 5 is a plan view of a cutting tool assembly for external face turning of a stepped square shoulder on a workpiece in accordance with a second embodiment of the present invention.
Figure 6:
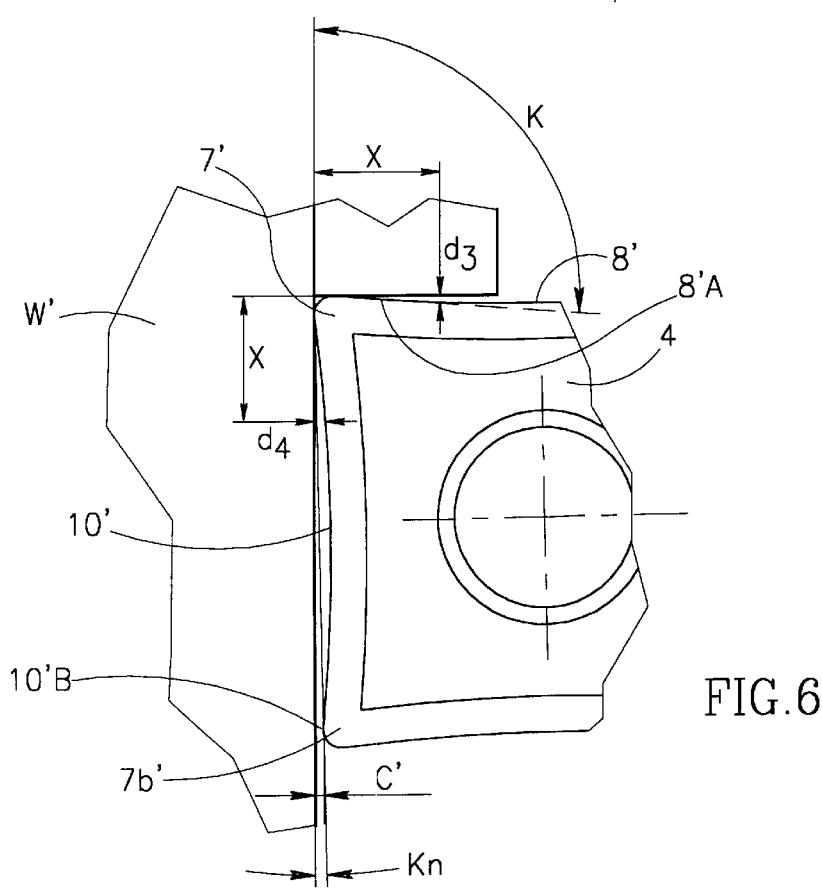
FIG. 6 is a close-up view of the operative insert cutting corner of the cutting tool assembly of FIG. 5.

Turning now to FIGS. 5 and 6, a cutting tool assembly 1' with the same cutting insert 4 is adapted for external face turning of a stepped square shoulder S' on a workpiece W' rotatable about an axis of rotation B. In this arrangement, the cutting insert 4 is so disposed that a clearance $d_3$ between the operative cutting edge 8' and the shoulder's cylindrical face is less than a clearance $d_4$ between the inoperative cutting edge 10' and the shoulder's end face at equal distances X along the cutting edges 8' and 10', the square shoulder's cylindrical and end faces respectively constituting its first and second surfaces. Here, the inoperative concave cutting edge 10', which serves as the assembly's side cutting edge, connects the operative insert cutting corner 7' to an inoperative trailing insert cutting corner 7b', while the operative concave cutting edge 8', which serves as the assembly's front cutting edge, connects the operative insert cutting corner 7' to an inoperative leading insert cutting corner 7a'.

As a consequence, as shown in FIG. 6, the cutting edge's trailing end 10'B has a clearance C' from the shoulder's end face whilst the operative cutting edge's lateral portion 8'A adjacent the operative insert cutting corner 7' delimits an obtuse entering angle κ which enables an outwardly directed axial feed out movement Q.

Thus, in this case, as shown in FIG. 5, due to the concavity of the operative cutting edge 8', there is a location therealong at which there is a minimal clearance from the shoulder's cylindrical face. This limits the maximal axial depth of cut of the cutting tool assembly 1' to less than the length of the cutting insert's side when squaring out a stepped shoulder in the direction Q.

Turning now to FIG. 7, a generally square cutting insert 13 has a central throughgoing bore 14 and an upper surface 15 having four side edges 16, each pair of adjacent side edges 16 meeting at an insert cutting corner 17.

Each side edge 16 is recessed with respect to an imaginary line 19 of a length L constituting one side of an imaginary square 20 in which the cutting insert 13 is inscribed in its plan view.

Figure 11:
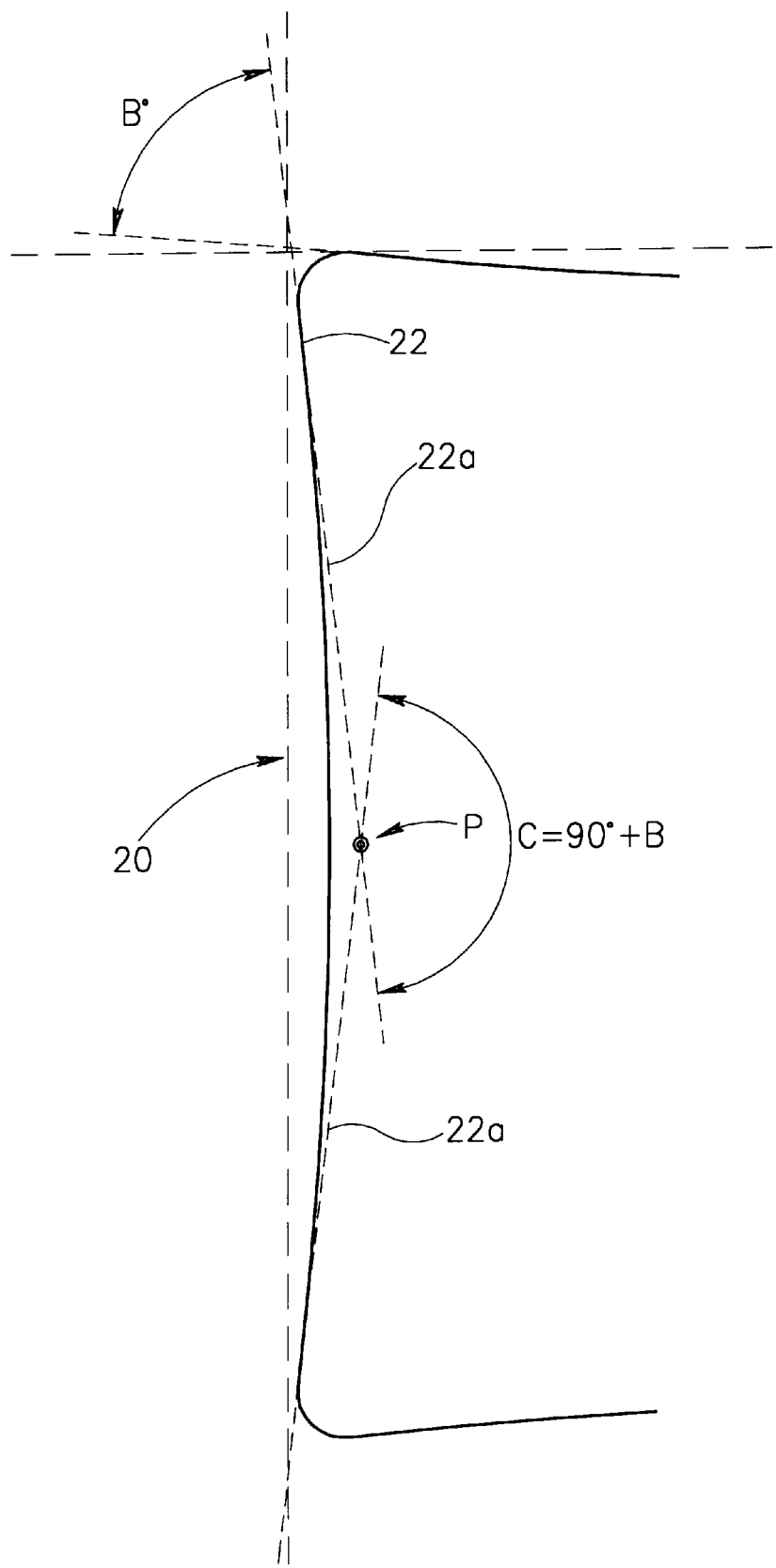
FIG. 11 is a plan view of the side edge of the cutting insert of FIG. 7.

Each side edge 16 has a straight central portion 21 between adjacent lateral portions 22, a lateral portion 22 constituting the lateral portions 10A and 8'A respectively of the cutting tool assemblies 1 and 1'. The juncture of lateral portions 22 belonging to adjacent side edges define an acute insert cutting corner angle B of 83°. Imaginary extensions 22a of the lateral portions 22 on either side of a corresponding central portion meet at a point P, which is insert relative to the associated side edge, as seen in FIG. 11.

Each central portion 21 is coextensive with the throughgoing bore 14 and tangential to am imaginary central inscribed circle 23. Thus, the straight central portions 21 of side edges on opposite sides of the throughgoing bore 14 are substantially parallel to each other along the extent of the diameter of the bore 14.

The cutting insert 13 can be a double sided cutting insert, thereby being formed with a total of eight insert cutting corners, and of a negative relief flank geometry 13A (see FIG. 8) or a double positive relief geometry 13B (see FIG. 9) for use in either of the cutting tool assemblies 1 or 1' with suitable adapted pocket therefor.

Figure 10:
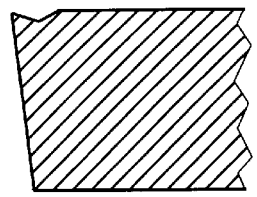

Alternatively, the cutting insert 13 can be a single sided positive cutting insert 13C (see FIG. 10), thereby being formed with four insert cutting corners, and built in relief flank geometry for mounting in a neutral toolholder having $\alpha_1 \approx \alpha_2 \approx 0°$ and adapted for turning stepped square shoulders of either limited maximum radial or axial depth of cut. Alternatively, such an insert can possess a large relief angle whereby it can be mounted on a positive type toolholder.

While the invention has been described with respect to a limited number of embodiments, it will be appreciated that many variations, modifications and other applications of the invention can be made. Thus, in addition to external operations as shown and described hereinabove, similar cutting tool assemblies can be adapted for internal boring of stepped square shoulders. In addition, the same cutting insert can be equally employed in both right and left hand directions in turning operations. Whilst, the cutting insert can be modified such that its acute insert cutting corner angle β lies in the range 83°±5°.

What is claimed is:

1. A cutting tool assembly in combination with a workpiece, said cutting tool assembly for turning a stepped square shoulder on said workpiece, the cutting tool assembly comprising a tool holder having seated therein a cutting insert presenting an acute insert cutting corner at the juncture of substantially concave operative and inoperative cutting edges;

characterized in that said cutting insert is substantially square shaped and is so disposed in a top view of the cutting tool assembly that a first non-zero clearance between said operative cutting edge and a first surface of the stepped square shoulder is less than a second non-zero clearance between said inoperative cutting edge and a second surface of the stepped square shoulder, said first and second non-zero clearances begin taken at equal distances from an intersection of said first and second surfaces and wherein a maximal depth of cut of the cutting tool assembly is limited to less than the length L of a side of an imaginary square in which the insert is inscribed, in a top view of the insert.

2. A cutting tool assembly in combination with a workpiece according to claim 1, wherein end and cylindrical faces of the square shoulder constitute said first and second surfaces, respectively, and whereby the cutting tool assembly is adapted for turning stepped square shoulders of a radial depth of cut not exceeding the length of a side of the cutting insert.

3. A cutting tool assembly in combination with a workpiece according to claim 1, wherein cylindrical and end faces of the square shoulder constitute said first and second surfaces, respectively, and whereby the cutting tool assembly is adapted for turning stepped square shoulders of a axial depth of cut not exceeding the length of a side of the cutting insert.

4. A fully indexable cutting insert having a substantially square upper surface, a lower surface, a central throughgoing bore transversing said upper and lower surfaces, and side surfaces intersecting with said upper surface at four substantially concave side edges, each of said side edges having a central portion which extends between adjacent lateral portions, central portions of side edges on opposite sides of said throughgoing bore being substantially parallel to one another and having a length substantially equal to that of a diameter of said throughgoing bore, and lateral portions of adjacent side edges meeting at an associated acute insert cutting corner, each of said central portions being tangential to an inscribed circle of the cutting insert and the angle of each of said acute insert cutting corners being in the range of about 83°±5°.

5. A cutting insert according to claim 4 wherein the cutting insert is double sided and of a negative relief flank geometry.

6. A cutting insert according to claim 4 wherein the cutting insert is double sided and of a double positive relief flank geometry.

7. The cutting insert according to claim 4 wherein the cutting insert is single sided and of a positive relief flank geometry.

8. The cutting insert of claim 4, wherein said insert has four acute insert cutting corners which, in a top view of the insert, are inscribed in an imaginary square having sides of length L, said central portions also being parallel to associated sides of said imaginary square.

9. A fully indexable cutting insert having a substantially square upper surface, a lower surface, a central throughgoing bore transversing said upper and lower surfaces and side surfaces intersecting with said upper surface at four substantially concave side edges, each of said side edges comprising a central portion between adjacent lateral portions, central portions of side edges on opposite sides of said throughgoing bore being substantially parallel to one another and having a length substantially equal to that of a diameter of said throughgoing bore, and lateral portions belonging to adjacent side edges meeting at an acute insert cutting corner, each of said acute insert cutting corners being in the range of about 83°±5°, and imaginary extensions of said adjacent lateral portions converging at a point which is inset relative to an associated side edge.

10. The cutting insert of claim 9, wherein said insert has four acute insert cutting corners which, in a top view of the insert, are inscribed in an imaginary square having sides of length L, said central portions also being parallel to associated sides of said imaginary square.

11. A cutting tool assembly in combination with a workpiece having an axis of rotation, the cutting tool assembly for turning a stepped square shoulder on said workpiece, the stepped square shoulder having perpendicularly disposed first and second surfaces, the cutting tool assembly comprising a tool holder having a cutting insert received therein, said cutting insert presenting an acute insert cutting corner at the juncture of a substantially concave operative cutting edge which is co-directional to a feed out direction of the cutting tool assembly relative to the workpiece and a substantially concave inoperative cutting edge which is transversely directed to said feed out direction, the cutting tool assembly having a tool back clearance angle $\kappa_n$ along said inoperative cutting edge and an obtuse entering angle κ along said cutting edge such that in a top view of the cutting assembly, the cutting insert is so disposed that a first non-zero clearance between said operative cutting edge and the first surface of the stepped square shoulder is less than a second non-zero clearance between said inoperative cutting edge and the second surface of the stepped square shoulder, said first and second non-zero clearances being taken at equal distances from an intersection of said first and second surfaces, wherein said cutting insert is substantially square shaped with an upper surface provided with four acute insert cutting corners which, in a top view of the insert, are inscribed in an imaginary square having sides of length L, and a maximum depth of cut into said workpiece along said feed out direction is less than said length L.

12. A cutting tool assembly in combination with a workpiece having an axis of rotation, said cutting tool assembly configured for turning a stepped square shoulder having perpendicularly disposed first and second surfaces on said workpiece, the cutting tool assembly comprising:

a tool holder having a cutting insert seated therein, said cutting insert having a substantially square upper surface, a lower surface and side surfaces intersecting with said upper surface at four substantially concave side cutting edges, adjacent pairs of side cutting edges forming a total of four acute insert cutting corners which, in a top view of the insert, are inscribed in an imaginary square sides of length L, said cutting tool assembly arranged such that:

an operative insert cutting corner is in contact with a stepped square shoulder on the workpiece with an operative cutting edge opposing said first surface and an inoperative cutting edge opposing said second surface;

in a top view of said tool assembly, a first non-zero clearance between the operative cutting edge and said first surface is less than a second non-zero clearance between the inoperative cutting edge and said second surface, said first and second non-zero clearances being taken at equal distances from an intersection of said first and second surfaces; and a maximum depth of cut in a feed out direction of the cutting tool assembly relative to the workpiece is less than the length L.

13. A method of turning a stepped square shoulder in a workpiece having an axis of rotation and perpendicular disposed first and second surfaces, the method comprising the steps of:

providing a cutting tool assembly comprising a tool holder having a cutting insert seated therein, said cutting insert having a substantially square upper surface, a lower surface and side surfaces intersecting with said upper surface at four substantially concave side cutting edges, adjacent pairs of side cutting edges forming a total of four acute insert cutting corners which, in a top view of the insert, are inscribed in an imaginary square having sides of length L;

positioning said cutting tool assembly relative to said workpiece such that an operative insert cutting corner is in contact with said stepped square shoulder on the workpiece with an operative cutting edge opposing said first surface and an inoperative cutting edge opposing said second surface such that in a top view of said tool assembly, a first non-zero clearance between the inoperative cutting edge and said second surface, said first and second non-zero clearances being taken at equal distances from an intersection of said first and second surfaces; and rotating said workpiece around said axis of rotation to cut said stepped square shoulder to a maximum depth of cut no greater than the length L, in a feed out direction of the tool holder relative to the workpiece.

14. A stepped square shoulder turning cutting tool assembly comprising:

a tool holder having a longitudinal axis and an insert receiving pocket formed at a leading end thereof; and a cutting insert seated in said insert receiving pocket, said cutting insert having a substantially square upper surface, a lower surface and insert side surfaces intersecting with said upper surface at four substantially concave insert side cutting edges, adjacent pairs of insert side cutting edges forming a total of four acute insert cutting corners which, in a top view of the insert, are inscribed in an imaginary square having sides of length L;

a first of said acute insert cutting corners serving as an operative cutting corner which, in a top view of the assembly, has an outermost portion in a direction transverse to said tool holder's longitudinal axis, and a forwardmost portion along said longitudinal axis in a direction of said leading end;

a second of said acute insert cutting corners serving as an inopertive trailing insert cutting corner which, in a top view of the assembly, is connected to said operative cutting corner by a first concave insert side cutting wedge whose entire length extends beyond the tool holder at said leading end in a lateral direction transverse to said longitudinal axis, and thereby forms an assembly side cutting edge;

a third of said acute insert cutting corners serving as an inoperative leading insert cutting corner which, in a top view of the assembly, is connected to said operative cutting corner by a second concave insert side cutting edge whose entire length extends beyond the tool holder at said leading end along said longitudinal axis, and thereby forms an assembly front cutting edge;

said tool holder and cutting insert together defining a geometry including a first imaginary line parallel to said longitudinal axis and tangential to said outermost portion of the operative cutting corner, and a second imaginary line perpendicular to said longitudinal axis and tangential to said forwardmost portion of the operative cutting corner, and wherein in a top view of said assembly, a first non-zero clearance between the first imaginary line and said assembly side cutting edge is different than a second non-zero clearance between the second imaginary line and said assembly front cutting edge, said first and second non-zero clearances being taken at equal distances from an intersection of said first and second imaginary lines along respective assembly side and assembly front cutting edges.

15. The assembly of claim 14, wherein the inopertive leading insert cutting corner is spaced apart from, and does not cross the second imaginary line and said first non-zero clearance is less than said second non-zero clearance.

16. The assembly of claim 14, wherein the inoperative trailing insert cutting corner is spaced apart from, and does not cross the first imaginary line and said second non-zero clearance is less than said first non-zero clearance.

* * * * *